United States Patent [19]

Puckette

[11] Patent Number: 5,123,102
[45] Date of Patent: Jun. 16, 1992

[54] METHOD AND APPARATUS FOR SUSPENDING COMPUTATION DUE TO DETECTION OF ELECTROSTATIC DISCHARGE

[75] Inventor: Robert B. E. Puckette, Corvallis, Oreg.

[73] Assignee: Hewlett-Packard Company, Palo Alto, Calif.

[21] Appl. No.: 285,992

[22] Filed: Dec. 19, 1988

[51] Int. Cl.⁵ .................. G06F 1/04; G06F 1/30; G06F 1/10; G06F 11/22
[52] U.S. Cl. .................. 395/550; 364/270.1; 364/270.4; 364/271; 364/271.1; 364/271.5; 364/273.4; 364/273.5; 364/221.4; 364/DIG. 2; 395/775
[58] Field of Search .................. 371/16.3; 379/213; 324/72.5; 361/212, 80; 363/41; 364/200 MS File, 900 MS File; 70/276; 395/375, 775, 550; 357/23.4

[56] References Cited

U.S. PATENT DOCUMENTS

| | | | |
|---|---|---|---|
| 4,092,714 | 5/1978 | Norton et al. | 364/200 |
| 4,306,288 | 12/1981 | Nakamura | 364/200 |
| 4,420,819 | 12/1983 | Price et al. | 364/900 |
| 4,481,556 | 11/1984 | Berke et al. | 361/222 |
| 4,482,064 | 11/1984 | Berke et al. | 211/69 |
| 4,586,106 | 4/1986 | Frazier | 361/212 |
| 4,586,179 | 4/1986 | Sirazi et al. | 371/12 |
| 4,629,831 | 12/1986 | Curtin et al. | 379/213 |
| 4,631,473 | 12/1986 | Honda | 324/72.5 |
| 4,654,746 | 3/1987 | Lewis, Jr. et al. | 361/212 |
| 4,682,958 | 7/1987 | Slavik et al. | 434/335 |
| 4,709,295 | 11/1987 | Yamaura et al. | 361/80 |
| 4,712,398 | 12/1987 | Clarkson et al. | 70/276 |
| 4,734,752 | 3/1988 | Liu et al. | 357/23.4 |
| 4,780,843 | 10/1988 | Tietjen | 364/900 |
| 4,809,126 | 2/1989 | Burkman et al. | 361/212 |
| 4,809,157 | 2/1989 | Eilert et al. | 364/200 |
| 4,844,630 | 7/1989 | Hagen et al. | 364/900 |
| 4,851,987 | 7/1989 | Day | 364/200 |
| 4,860,185 | 8/1989 | Brewer et al. | 363/41 |
| 4,875,156 | 10/1989 | Tanagawa et al. | 364/200 |

*Primary Examiner*—Thomas C. Lee
*Assistant Examiner*—Daniel Pan

[57] ABSTRACT

Apparatus for detecting electrostatic discharge events that may affect operation of a calculator and for suspending the operation of an internal calculator chip before the discharge can corrupt the chip's operation. The apparatus includes an edge detector that detects the discharge event and generates a signal to timer circuitry. The timer circuitry in response generates a signal for a predetermined time to WAIT circuitry which suspends operation of the calculator chip before its calculations can be corrupted. The predetermined time is long enough for the electrostatic discharge to dissipate sufficiently so that it can no longer corrupt the calculations. After the predetermined time passes, the calculator chip resumes its operation to complete its calculations.

8 Claims, 1 Drawing Sheet

METHOD AND APPARATUS FOR SUSPENDING COMPUTATION DUE TO DETECTION OF ELECTROSTATIC DISCHARGE

TECHNICAL FIELD

This invention relates to digital hand held calculators and small desktop computers. The invention discloses a method and apparatus to prevent corruption of calculations due to electrostatic discharges interrupting or altering the data or the program steps of the calculation.

BACKGROUND

Modern digital hand held calculators or small desktop computers utilize microprocessors or calculator chips and other discrete electronic devices for their operation. These devices can be damaged or destroyed by electrostatic discharges emanating from the user to the device. These electrostatic discharges can be in the range of many tens of thousands of volts over short periods of time. Typically, these discharges are coupled to the printed circuit board holding the microprocessor chip or other discrete devices by means of capacitive or inductive coupling to the user. Many methods are utilized to protect the electronic components. These methods can include means to deflect or dissipate the electrostatic discharge. As an example, in hand held calculators, housings can be formed of a conductive plastic, or shielded by a metal piece. Some plastics can be made conductive by including conductive material which will dissipate the electrostatic discharges. Of necessity, small hand held calculators or desktop computers have keyboards and display devices. These keyboards and display devices must be inter-connected to the printed circuit board of the calculator or computer. Shields of metallic substances are typically placed about these connectors to prevent any electrostatic discharge from being impressed on the printed circuit board.

Unfortunately, no matter how completely a calculator is shielded, some electrostatic discharge events are impressed by capacitive or inductive means on to some of the traces of the printed circuit board. These electrostatic events can corrupt the computing sequences of the calculator by either corrupting the data or the individual calculating steps being performed by the calculator chip. It is therefore an object of the invention to provide a means and an apparatus for preventing corruption of the calculating steps being performed by the calculator chip. It is a further object of this invention to suspend the operation of the calculator chip before an electrolstatic discharge event can impress itself upon the chip.

DISCLOSURE OF INVENTION

In its simplest form, a hand held calculators is composed of a housing with a display device and a keyboard mounted externally on that housing. A printed circuit board is located inside the housing and interconnects not only the display and the keyboard, but also other electronic devices such as microprocessor or calculator chips and memory chips. The printed circuit board typically is a nonconductive substrate having metallic traces etched on the surface. The board provides not only electrical interconnections between the components, but also physical support for the delicate electronic components. The traces of the printed circuit board interconnecting all of the components have varying lengths as to the needs for the interconnection. At least one of these traces is longer than the other traces. Typically, it will be on an edge and may interconnect the microprocessor chip and, for instance, the keyboard. Typically this long trace will have many edges as it winds about the printed circuit board. In the present invention, a detector is coupled to this long trace of the printed circuit board. Any electrostatic discharge event will be impressed on this long trace through conductive or inductive means from the operator to the printed circuit board. The detector detects this event and creates a trigger signal. The trigger signal then activates a device which will create and hold an output signal or steady state signal for a set period of time. The output signal is then impressed on the WAIT-circuitry of the microprocessor chip. The calculator chip then suspends operation for the length of time that this output signal is impressed upon it. Typically, an electrostatic event can last as long as two to three milliseconds. A reasonable length of time to suspend operation of the calculator chip would then be in the neighborhood of ten milliseconds.

BEST MODE FOR CARRYING OUT INVENTION

Figure 1:
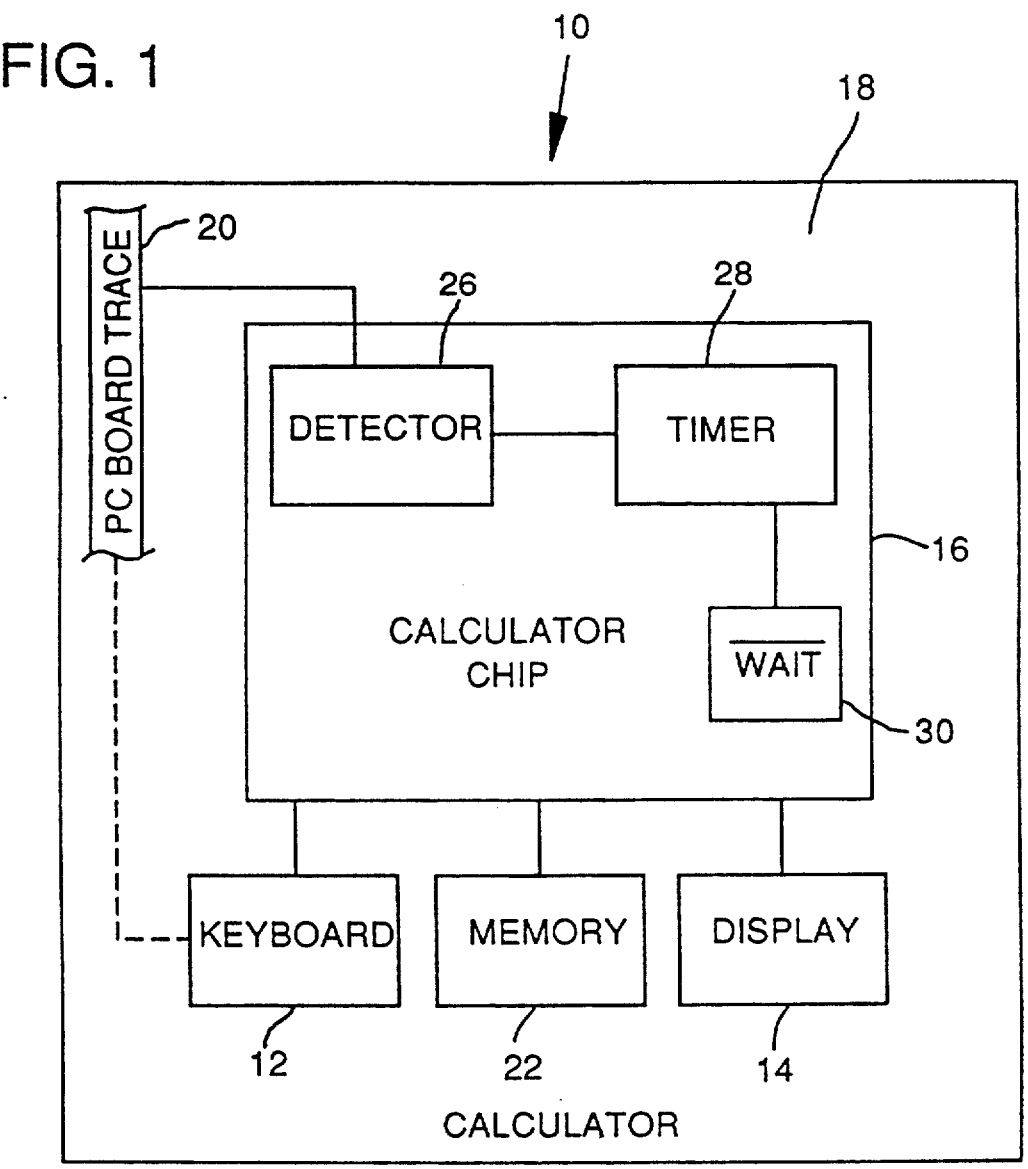
FIG. 1 is a block diagram of a calculator which has electro-static discharge tolerant computing capabilities.
Figure 2:
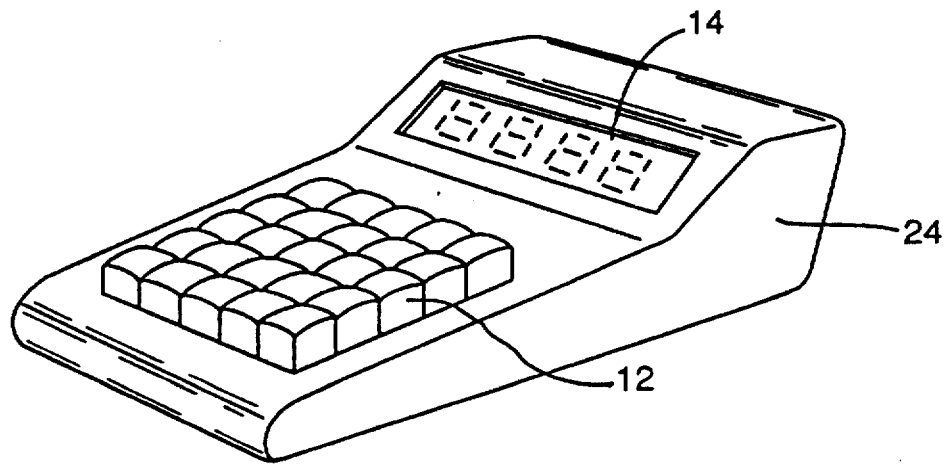
FIG. 2 is an illustration of a simple calculator.

Referring to FIG. 1, a schematic of a simple hand held calculator 10 is shown. The calculator in its simplest form consists of a keyboard 12, a display 14, a calculator chip 16, and a printed circuit board 18 with at least one long trace 20 on the circuit board. Additional components such as memory 22 may be included in more complex calculators. Generally, these hand held calculators are enclosed in a housing 24 as shown in FIG. 2. The housing can be of any material but typically is made of plastic. Sometimes the plastic is electroplated or has metallic overlays which effect a shield. This makes the housing conductive and dissipates or deflects any electrostatic discharge which otherwise would be passed from the user to the calculator upon the user touching the calculator. The keyboard and display must be visible and accessible outside the housing. The keyboard and display can be mounted directly on the printed circuit board with the housing having cutouts to merely enclose them, or they could be mounted directly on the housing as shown in FIG. 2 with flexible interconnections between the keyboard, display and the printed circuit board. If interconnections are used it is usual to shield these connectors with some conductive material such as thin metallic sheets. Again, the purpose of the shielding is to prevent an electrostatic discharge from passing from the user to the electronic components of the calculator. An operator can pick up electrostatic charges from merely walking across the floor, moving one's clothing or other similar means. Even though protective measures such as conductive housings and shields are used to prevent gross damage caused by ultra-high voltages in the neighborhood of 30,000 volts, some voltages are still impressed on the printed circuit board. These voltages are impressed by capacitive or inductive coupling between the user and the printed circuit board.

The printed circuit board 18 is typically a nonconductive material upon which a thin metallic covering has been etched away leaving thin metallic traces to interconnect the various components of the calculator. At least one of these traces tends to be longer than the remaining traces. This long trace 20 may, for instance, interconnect the calculator chip to the keyboard. For the purposes of this invention, it is unimportant as to which trace is considered a long trace. This trace can, for instance, be the ground plane trace or a signal trace. What is important is that the particular trace chosen has several edges which could increase the capacitive or inductive coupling between the trace and the user.

In accordance with the invention, a detector 26 is coupled to this long trace. The detector can be any one of a number of electronic devices such as an operational amplifier which is an analog device or a flip flop which is a digital device. The important feature of the detector is that it must be an edge detector and detect the leading edge of any event. The importance of this feature is that it halt the operation of the calculator before the voltage gets high enough to corrupt any calculating sequence. The detector 26 is one capable of generating a signal which can be a trigger signal when an electrostatic discharge event is detected on the long printed circuit board trace. Electrostatic discharge events have been measured to occur over a timespan of up to two milliseconds. The detector is connected to a timer 28 which generates and holds an output signal or steady state signal for a set period of time sufficiently long enough to ensure that the calculating capability of the microprocessor or calculator chip is not corrupted during the length of time of the electrostatic discharge events. Preferably the timer will generate a steady state signal or output signal at a high logic level for a period of 10 milliseconds or less. A time of 10 milliseconds would be longer than any electrostatic event and would guarantee that the event had dissipated. It should be understood that a time less than 10 milliseconds could work as well.

The timer is connected to the WAIT circuitry 30 of the calculator chip and the output signal from the timer then is impressed upon the input of the WAIT circuitry. The WAIT circuitry is a conventional internal circuit within the calculator chip which suspends operation of the calculator chip as long as a logic high level is impressed upon the WAIT circuitry.

In the preferred embodiment of this invention, the detector and the timer are integral with and part of the circuitry of the calculator chip. As is well known in the microprocessor chip arts, these type of devices can be easily built into a microprocessor or calculator chip.

INDUSTRIAL APPLICABILITY

The present invention can be used in any calculator or desktop computer to prevent corruption of the calculating sequences due to electrostatic discharge events being impressed from the operator to the printed circuit board of the calculators. This insures that the calculator has electrostatic discharge tolerant computing and that the calculations will not be corrupted by any electrostatic discharge event.

Of course, it should be understood that a wide range of changes and modifications can be made to the preferred embodiments described above. It is therefore intended that the foregoing description be regarded as illustrative rather than limiting, and that it be understood that it is the following claims, including all equivalents, which are intended to define the scope of the invention.

I claim:

1. In a calculating device having a processing means, apparatus for preventing electrostatic discharge from corrupting calculations by the processing means, comprising:
   an edge detector for detecting a leading edge of an electrostatic discharge to the device before the discharge is coupled to the processing means; and
   suspending means responsive to the detecting means for suspending operation of the processing means for a predetermined time,
   the operation of the processing means thereby suspended from a time before the electrostatic discharge can corrupt its calculations until a time that the electrostatic discharge dissipates sufficiently so that it can no longer corrupt the calculations.

2. The apparatus of claim 1 wherein the suspending means comprises:
   timing means responsive to the detecting means for generating a signal for a predetermined time; and
   WAIT means responsive to the signal of the timing means for suspending operation of the processing means for the predetermined time.

3. In a calculating device having a processing means, apparatus for preventing electrostatic discharge, from a user to the device, from corrupting calculations by the processing means, comprising:
   an edge detector for detecting a leading edge of an electrostatic discharge to the calculating device before the discharge is coupled to the processing means;
   timer circuitry within the calculating device responsive to the edge detector for generating a signal for a predetermined time; and
   WAIT circuitry responsive to the signal of the timer circuitry means for suspending operation of the processing means for the predetermined time after which the processing means resumes operation to complete its calculations.

4. The apparatus of claim 3 wherein the edge detector is a flip flop.

5. The apparatus of claim 3 wherein the timer circuitry is a monostable multivibrator.

6. The apparatus of claim 3 wherein the predetermined time is less than 10 milliseconds.

7. The apparatus of claim 3 wherein the electrostatic discharge is impressed by capacitive or inductive means on to the calculating device.

8. In a calculating device, a method of preventing corruption of calculations, comprising:
   providing an edge event detector connected to the calculating device;
   detecting with the edge detector an electrostatic discharge to the device before the discharge is coupled to processing means within the device;
   suspending, in response to such a detection, operation of the processing means for a predetermined time; and
   resuming operation of the processing means after the predetermined time has elapsed to complete its calculations.

* * * * *